United States Patent [19]

Hartwig et al.

[11] Patent Number: 5,058,690
[45] Date of Patent: Oct. 22, 1991

[54] ROCK WORKING TOOL

[75] Inventors: Carl S. M. Hartwig, Täby; Ove V. E. Nilsson, Örebro, both of Sweden

[73] Assignee: Atlas Copco Construction and Mining Technique AB, Stockholm, Sweden

[21] Appl. No.: 515,834

[22] Filed: Apr. 27, 1990

[30] Foreign Application Priority Data

May 9, 1989 [SE] Sweden .................. 8901625

[51] Int. Cl.$^5$ ............................................. E21B 10/18
[52] U.S. Cl. ....................................... 175/339; 299/81
[58] Field of Search ..................... 299/81, 86; 175/339, 175/340

[56] References Cited

U.S. PATENT DOCUMENTS

| 1,130,289 | 3/1915 | Hughes | 175/339 |
| 1,151,104 | 8/1915 | Humason | 175/339 |
| 1,532,551 | 4/1925 | Reed | 175/339 |
| 3,698,769 | 10/1972 | Amoroso | 299/81 |
| 4,363,367 | 12/1982 | Dixon et al. | 299/81 |
| 4,718,730 | 1/1988 | Unger | 299/81 |

FOREIGN PATENT DOCUMENTS 0717326 2/1980 U.S.S.R. ................. 299/81

Primary Examiner—Bruce M. Kisliuk
Attorney, Agent, or Firm—Eric Y. Munson; Mark P. Stone

[57] ABSTRACT

Rock working tool for a tunnel boring machine. The tool comprises a shaft (34) with a central hole (35). A tool part (8,9) is rotatably journalled on the shaft. The tool is cooled through the arrangement of channels (40,41,42) in the tool for conducting cooling liquid from a pressure liquid source (22) to the central hole and via the channel (42) which flushes directly on the tool part (8,9).

1 Claim, 2 Drawing Sheets

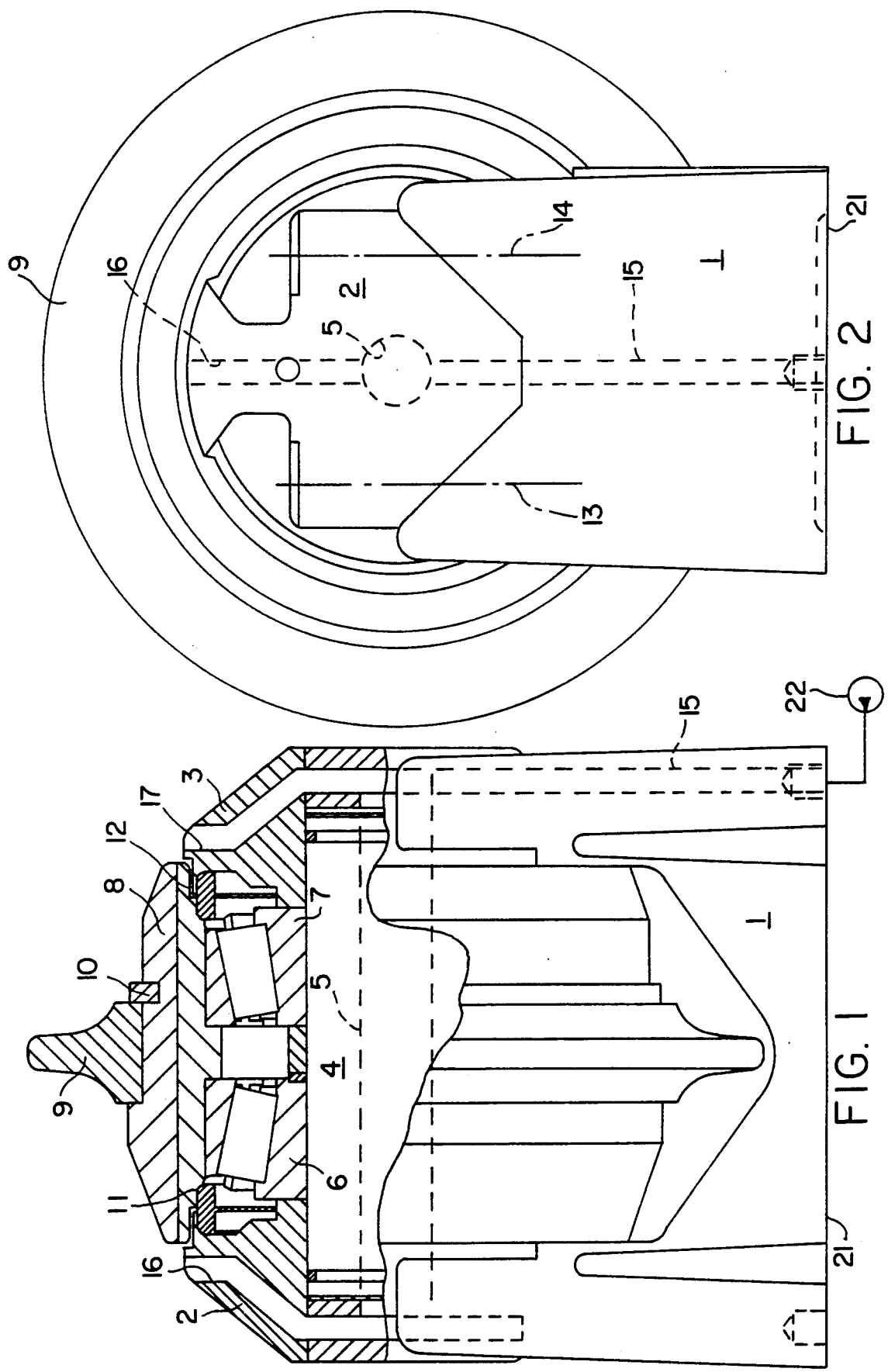

ROCK WORKING TOOL

The present invention relates to a rock working tool meant for mounting on the boring head of a tunnel boring machine. The tool comprises a cutter which with large force is pressed against a rock surface by the tunnel boring machine at the same time as the boring head is rotated.

In prior art rock working tools of the above mentioned kind the rock cutting capacity of the tool is limited because the tool becomes very hot during operation, through which the strength of the tool is deteriorated.

The present invention, which is defined in the subsequent claim, aims at achieving a rock working tool which can be loaded substantially more than prior art tools because the tool is cooled during operation.

Two embodiments of the invention are described below with reference to the accompanying drawings in which FIG. 1 shows a rock working tool according to a first embodiment of the invention partly in section.

FIG. 2 shows an end view of the tool according to FIG. 1.

Figure 3:
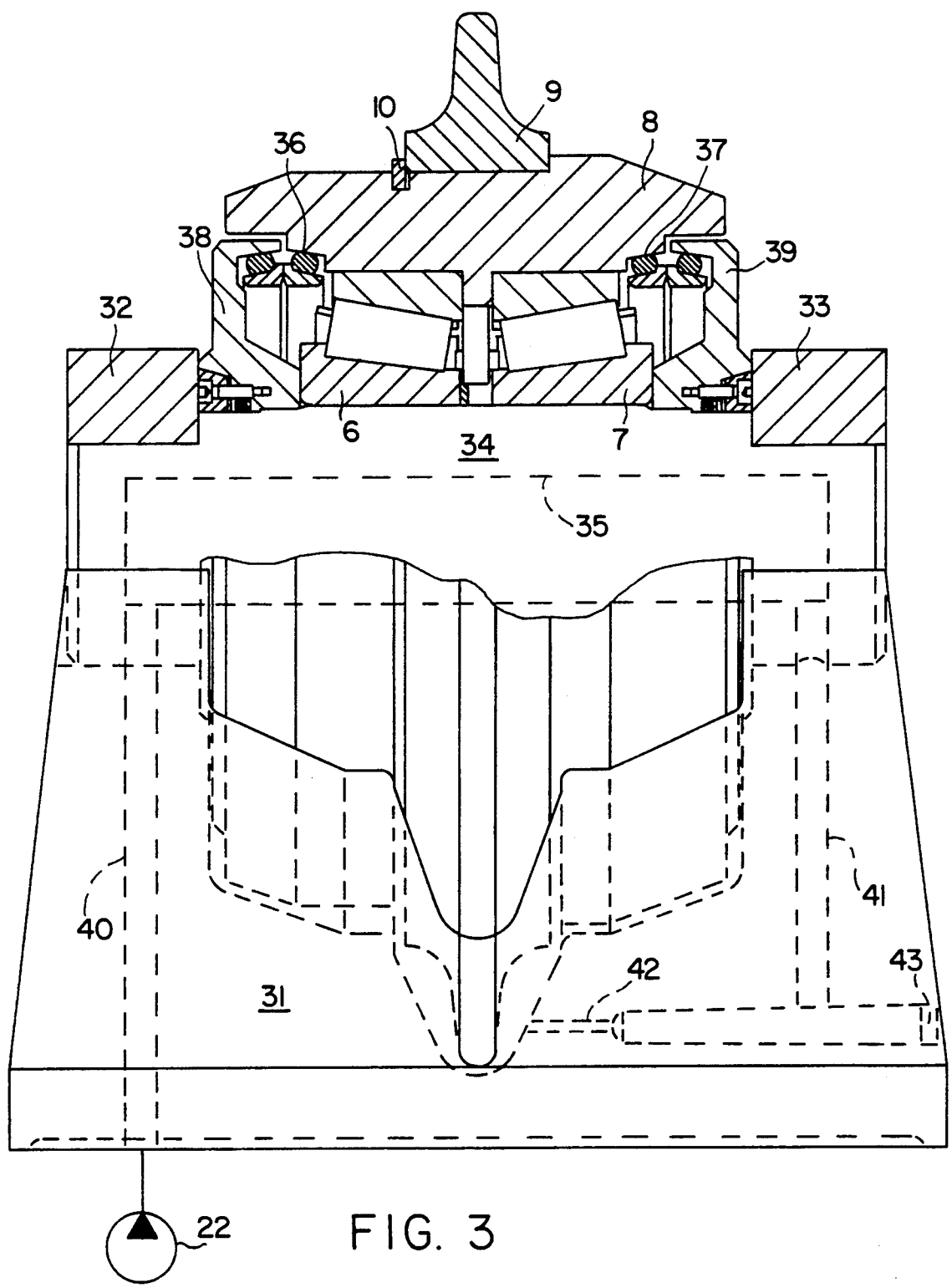
FIG. 3 shows a rock working tool according to a second embodiment of the invention partly in section.

The tool shown in FIGS. 1 and 2 comprises a saddle 1 which in a suitable way, e.g. welding along the edge 21, is secured to a not shown boring head of a tunnel boring machine. Two end pieces 2,3 are fastened to the saddle 1 by means of screws which are marked by lines 13,14. The end pieces 2,3 carry a shaft 4 which is provided with a central hole 5. Two rolling bearings 6,7 are mounted on shaft 4. These bearings carry a rotatable ring 8 on which a tool ring 9 is kept in place by a locking ring 10. Two seals in form of steel rings 11,12 are arranged between the rotatable ring 8 and end pieces 2,3 to prevent dirt from entering into the bearings 6,7. Saddle 1 and end pieces 2,3 are provided with channels 15,16,17 to convey cooling liquid to the central hole 5 and to flush cooling liquid on the tool ring 9 and the rotatable ring 8. A pressure liquid source 22 is arranged to feed cooling liquid to channel 15. During boring of the tunnel rock pieces broken loose are collected on the tunnel floor. The radially outer rock working tools must during boring pass through the collection of rock pieces broken loose. This problem is decreased considerably by the present invention which results in a flushing away of these rock pieces to a substantial degree from the area where the tool is working. A further substantial advantage with the present invention is that the weight of the tool is decreased substantially, which is of great importance when changing tools.

The embodiment of the invention shown in FIG. 3, which is the preferred embodiment because of better cooling of the tool ring, comprises a saddle 31 which during operation of the rock working tool is mounted on the boring head of a tunnel boring machine. A shaft 34 is clamped to the saddle by means of two end pieces 32,33. A tool part 8,9 comprising a rotatable ring 8 and a tool ring 9 secured to the rotatable ring by a locking ring 10 is rotatably journalled by means of bearings 6,7 on shaft 34. In order to prevent dirt from entering into the bearings seals 36,37 are provided between seal holders 38,39 and the rotatable ring 8. Saddle 31 is provided with a channel 40 extending between a pressure liquid source 22 and shaft 34 for communication with the central hole 35. Saddle 31 is further provided with a channel 41 extending from shaft 34 to a channel 42 to convey liquid to channel 42 for flushing the tool ring 9. Channel 42 is closed at one end by a plug 43.

We claim:

1. Rock working tool for a tunnel boring machine comprising a saddle (31), a shaft (34) mounted to said saddle, two end pieces (32, 33), mounted to opposed ends of said shaft for securing said shaft to said saddle, and a tool part (8, 9) journalled on said shaft, characterized in that said shaft (34) comprises a central hole (35), that said saddle (31) comprises channels (40, 41, 42) which communicate with said central hole (35) and that at least one (40) of said channels is in fluid communication between said central hole and a pressure liquid source (22) of cooling medium and at least one other of said channels (42) is in fluid communication between said central hole and a flushing exit, such that the rock working tool is cooled by the flow of said cooling medium through the central hole (35) and said at least one of said channels, and the tool part (8, 9) is cooled by said liquid cooling medium which is flushed out from said flushing exit through said at least one other (42) of said channels in fluid communication between said central hole and said flushing exit.

* * * * *